United States Patent
Waki et al.

(10) Patent No.: US 10,167,728 B2
(45) Date of Patent: Jan. 1, 2019

(54) SEAL MEMBER, TURBINE, AND GAS TURBINE

(71) Applicant: MITSUBISHI HEAVY INDUSTRIES, LTD., Tokyo (JP)

(72) Inventors: Kunihiko Waki, Tokyo (JP); Masato Araki, Tokyo (JP); Kenichi Arase, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 569 days.

(21) Appl. No.: 14/387,440

(22) PCT Filed: Mar. 25, 2013

(86) PCT No.: PCT/JP2013/058500
§ 371 (c)(1),
(2) Date: Sep. 23, 2014

(87) PCT Pub. No.: WO2013/146637
PCT Pub. Date: Oct. 3, 2013

(65) Prior Publication Data
US 2015/0030442 A1    Jan. 29, 2015

(30) Foreign Application Priority Data
Mar. 28, 2012   (JP) ................ 2012-073707

(51) Int. Cl.
*F01D 11/00* (2006.01)
*F01D 9/04* (2006.01)
*F02C 7/28* (2006.01)

(52) U.S. Cl.
CPC ............ *F01D 9/042* (2013.01); *F01D 11/003* (2013.01); *F01D 11/005* (2013.01); *F02C 7/28* (2013.01); *F05D 2240/11* (2013.01)

(58) Field of Classification Search
CPC ............................. F01D 11/003; F01D 11/005
(Continued)

(56) References Cited

U.S. PATENT DOCUMENTS 3,752,598 A    8/1973  Bowers et al.
3,800,864 A *  4/1974  Hauser ............... F01D 25/12
                                                165/186

(Continued)

FOREIGN PATENT DOCUMENTS

CN    1318138 A    10/2001
CN    1475654 A    2/2004
(Continued)

OTHER PUBLICATIONS

Extended (supplementary) European Search Report dated Jun. 21, 2016, issued in counterpart European Patent Application No. 13767613.6. (9 pages).
(Continued)

*Primary Examiner* — Igor Kershteyn
*Assistant Examiner* — Jason Fountain
(74) *Attorney, Agent, or Firm* — Westerman, Hattori, Daniels & Adrian, LLP

(57) ABSTRACT

In a seal member, a turbine, and a gas turbine, a plurality of vanes includes a vane main body extending in a radial direction of an axis, an outer shroud, an inner shroud and forming a main flow path of a combustion gas between the outer shrouds and the inner shroud, and a retainer protruding from an inner surface in the radial direction of the inner shroud to the inside in the radial direction. The retainers in the vanes, which are adjacent to each other in the circumferential direction, are adjacent to each other in the circumferential direction via a third gap, and relative to one end of (Continued)

the seal member, the other end is positioned downstream in a direction along the axis in the combustion gas to close the third gap.

5 Claims, 8 Drawing Sheets

(58) Field of Classification Search
    USPC .......................................................... 415/134
    See application file for complete search history.

(56) References Cited

U.S. PATENT DOCUMENTS

| | | | | |
|---|---|---|---|---|
| 5,154,577 | A * | 10/1992 | Kellock | F01D 11/005 277/641 |
| 5,868,398 | A | 2/1999 | Maier et al. | |
| 6,254,333 | B1 * | 7/2001 | Merry | F01D 5/187 29/889.2 |
| 7,534,088 | B1 | 5/2009 | Alvanos et al. | |
| 7,798,768 | B2 * | 9/2010 | Strain | F01D 9/042 415/135 |
| 8,794,640 | B2 * | 8/2014 | Bergman | F01D 11/005 277/652 |
| 2002/0159880 | A1 | 10/2002 | Morris et al. | |

FOREIGN PATENT DOCUMENTS

| | | |
|---|---|---|
| EP | 0578460 A1 | 1/1994 |
| EP | 2 360 350 A2 | 8/2011 |
| JP | 06-066105 A | 3/1994 |
| JP | 10047083 A | 2/1998 |
| JP | 10-252412 A | 9/1998 |
| JP | 10-259703 A | 9/1998 |
| JP | 10-266807 A | 10/1998 |
| JP | 2000064807 A | 2/2000 |
| JP | 2006-342797 A | 12/2006 |
| JP | 2006342804 A | 12/2006 |
| JP | 2010-77868 A | 4/2010 |
| JP | 2010106791 A | 5/2010 |

OTHER PUBLICATIONS

International Search Report dated Jun. 11, 2013, issued in counterpart International Application No. PCT/JP2013/058500, w/English translation.
Written Opinion issued in counterpart International Application No. PCT/JP2013/058500, dated Jun. 11, 2013, w/English translation.
Chinese Office Action dated Aug. 31, 2015 issued in counterpart Chinese Application No. 201380012967.5 with partial English translation, (11 pages).
Japanese Notice of Allowance dated Oct. 27, 2015 issued in counterpart Japanese Application No. 2014-507848 with partial English translation. (6 pages).

* cited by examiner

SEAL MEMBER, TURBINE, AND GAS TURBINE

TECHNICAL FIELD

The present invention relates to disposition of a seal member in a turbine vane.

Priority is claimed on Japanese Patent Application No. 2012-073707, filed Mar. 28, 2012, the content of which is incorporated herein by reference.

BACKGROUND ART

In the related art, there is a known gas turbine configured to take air into a compressor and generate compressed air, supply the compressed air into a combustor and combust fuel to generate a combustion gas, cause the combustion gas to pass through a main flow path in which a plurality of turbine vane rows and a plurality of turbine blade rows are alternately disposed, and cause the combustion gas to flow along the axis of a rotary shaft from an upstream side to a downstream side, thereby rotating the rotary shaft.

Here, FIG. 8 shows an example of such a gas turbine 100 (see Patent Literature 1).

As shown in FIG. 8, the gas turbine 100 includes a turbine vane row 21, a turbine blade row 22, a turbine disk 23 to which the turbine blade row 22 is attached, an intermediate shaft cover 24, a support ring 25 fixed to the intermediate shaft cover 24 via a bolt 26, and so on.

In the following description, the turbine vane row 21 will be described as the turbine vane row 21 of a first stage (hereinafter referred to as a first vane row 21) on the most upstream side to which a transition piece 27 of a combustor is connected, and the turbine blade row 22 will be described as the turbine blade row 22 of a first stage (hereinafter referred to as a first blade row 22) adjacent to the downstream side of the first vane row 21.

The first vane row 21 forms an annular shape with a plurality of vanes arranged in the circumferential direction of a turbine. Each of the vanes has a vane main body 21c extending in the radial direction of the rotary shaft, an outer shroud 21a installed at an outer end section in the radial direction of the vane main body 21c, an inner shroud 21b installed at an inner end section in the radial direction of the vane main body 21c, and a retainer 21d protruding inward in the radial direction from a rear surface (a lower side of the drawing) which is a surface inside in the radial direction of the inner shroud 21b. In addition, the first vane row 21 is fixed via a pin 28 to the support ring 25, which is fastened to the intermediate shaft cover 24 by a bolt, such that a downstream surface of the retainer 21d butts against the support ring 25.

In addition, as shown in FIG. 9, the inner shrouds 21b of the vanes of the first vane row 21 are formed in substantially a parallelogram (a diamond shape) when seen in a front view, and connected such that one ends abut each other in the circumferential direction of the axis of the rotary shaft, and slight gaps K are formed between divided surfaces. The vane main body 21c forms an arc shape, and forms a tapered shape in which the width dimension in the circumferential direction is reduced toward the downstream side (the right side of FIG. 8). Further, with its downstream surface butting against the support ring 25, the retainer 21d receives a load in a thrust direction, i.e., the axial direction, due to the differential pressure of a combustion gas G applied to the vane main body 21c, and suppresses displacement of the first vane row 21 in a direction in which it approaches the first blade row 22.

The first blade row 22 forms an annular shape with a plurality of blades arranged in the circumferential direction of the turbine. Each of the blades includes a blade main body 22b extending in the radial direction of the rotary shaft, and a platform 22a installed at the inner end section in the radial direction of the blade main body 22b. Ring segments 29 located at the inner circumference of a turbine casing (not shown) are disposed outside in the radial direction of the first blade row 22 so as to face a distal end of the blade main body 22b.

Accordingly, the vane main body 21c and the blade main body 22b are disposed in a space surrounded by the outer shroud 21a and the ring segment 29, and the inner shroud 21b and the platform 22a, and this space serves as a main flow path FC1 through which the combustion gas G passes.

Meanwhile, a casing S1 configured to store cooling air exiting the compressor is provided inside in the radial direction of the inner shroud 21b of the first vane row 21. In the inner shroud 21b, in order to separate the main flow path FC1, through which the combustion gas G flows, and the casing S1 from each other, a seal plate 31 is disposed along the divided surface between the adjacent inner shrouds 21b in the axial direction of the rotary shaft, and a seal plate 32 is disposed between the adjacent retainers 21d in the radial direction, thereby closing the gap K. Normally, an air pressure on the casing S1 side is higher than the combustion gas pressure in the main flow path FC1, so that the combustion gas G does not leak into the casing S1.

CITATION LIST

Patent Literature

[Patent Literature 1] Japanese Unexamined Patent Application, First Publication No. H10-266807

SUMMARY OF INVENTION

Technical Problem

However, as shown in FIG. 8, an annular space N1 which is a slight gap exists between the support ring and a rear surface of the inner shroud 21b (a surface facing inward in the radial direction) from a position of the retainer 21d to the downstream end section of the inner shroud 21b. Since the space N1 is separated from the casing S1 by the retainer 21d and the support ring 25, the space N1 has substantially the same pressure as the interstage pressure between the first vane row 21 and the first blade row 22. That is, since the pressure of the combustion gas G flowing through the main flow path FC1 corresponding to the position of the space N1 is higher than the pressure of the space N1, the combustion gas G easily flows into the space N1 along the seal plate 31 from the gap K. That is, leaking gas LG, which is part of the combustion gas G, flows into the space N1 from the gap K, which may cause the rear surface of the inner shroud 21b and the upper surface of the support ring 25 to be burnt.

The present invention provides a seal member, a turbine, and a gas turbine that are capable of suppressing inflow of the leaking gas of the combustion gas from between the adjacent inner shrouds and preventing the components from being burnt.

Solution to Problem

A seal member according to a first aspect of the present invention is a seal member installed at a vane row constituted of a plurality of vanes disposed side by side in the circumferential direction of the axis of a turbine. The plurality of vanes includes a vane main body extending in the radial direction of the axis, an outer shroud installed at an outer end section in the radial direction of the vane main body, an inner shroud installed at an inner end section in the radial direction of the vane main body to form a main flow path of a combustion gas between the outer shroud and the inner shroud, and a retainer protruding from an inner surface in the radial direction of the inner shroud inward in the radial direction, wherein the inner shrouds in the vanes, which are adjacent to each other in the circumferential direction, are adjacent to each other in the circumferential direction via a first gap, the vane main bodies in the vanes, which are adjacent to each other in the circumferential direction, are adjacent to each other in the circumferential direction via a second gap, the retainers in the vanes, which are adjacent to each other in the circumferential direction, are adjacent to each other in the circumferential direction via a third gap, and relative to one end of the seal member, the other end is positioned on the downstream side in a direction along the axis in a flow direction of the combustion gas in the turbine to close the third gap.

A space upstream from the retainer and inside in the radial direction of the inner shroud (hereinafter referred to as a first space) has a pressure relatively higher than that in the main flow path. In addition, at a position at which the vane main body is installed, a space on the downstream side of the main flow path (hereinafter referred to as a third space) has a pressure relatively lower than that in a space on the upstream side of the main flow path (hereinafter referred to as a second space). Further, since the third space in the main flow path is disposed downstream from the retainer, and a space inside in the radial direction of the inner shroud (hereinafter referred to as a fourth space) communicates with the third space, the forth space has the same pressure as in the third space. Accordingly, the state of the pressure is as follows: the first space>the second space>the third space=the fourth space.

In the present invention, relative to one end of the seal member, the other end is installed to be positioned downstream from the one side, so that the first space can be expanded further downstream. That is, the first space having the pressure higher than that in the second space can be expanded further downstream, and the combustion gas leaking from the second space toward the fourth space via the first gap due to the differential pressure can be suppressed.

In addition, in the seal member according to a second aspect of the present invention, in the second gap, the one end according to the first aspect may be positioned upstream in the direction along the axis in the flow direction of the combustion gas from an intersection point between the first gap and a throat line connecting contact points of minimum inscribed circles in contact with the vane main bodies adjacent to each other, and the other end may be positioned downstream from the intersection point.

The space (the fourth space) downstream from the intersection point in the main flow path has a pressure relatively lower than that of the space (the second space) upstream from the intersection point. Accordingly, by installing the seal member so that the other end of the seal member is positioned downstream from the intersection point, the first space can be expanded downstream from the intersection point so as to have a higher pressure than the second space, so that the leakage of the combustion gas from the second space to the fourth space can be more effectively suppressed.

In addition, in the seal member according to a third aspect of the present invention, the one end may be positioned upstream in the direction along the axis in the flow direction of the combustion gas from the same pressure position, which is a position in the main flow path at which the pressure is the same as the pressure on the downstream side of the retainer according to the first aspect and on the inside in the radial direction of the inner shroud, and the other end may be positioned downstream from the same pressure position.

The space (the fourth space) downstream from the same pressure position in the main flow path has a pressure relatively lower than that in the space (the second space) upstream from the same pressure position. By installing the seal member so that the other end of the seal member is positioned downstream from the same pressure position, the first space can be expanded to the downstream side of the same pressure position so as to have a higher pressure than the second space, so that the leakage of the combustion gas from the second space to the fourth space can be more effectively suppressed.

In addition, the seal member according to a fourth aspect of the present invention may include a longitudinal seal plate that forms a plate shape extending from an end section inside in the radial direction of the retainer according to any one of the first to third aspects to a halfway position outside in the radial direction, and a diagonal seal plate having one end in contact with an end section outside in the radial direction of the longitudinal seal plate and forming a plate shape inclined and extending from the inside in the radial direction toward the outside as it extends toward the downstream side.

In this way, since the seal member has the longitudinal seal plate and the diagonal seal plate and the first space is expanded further downstream such that the pressure thereof is higher further on the downstream side than that in the second space, the inflow of the combustion gas from the second space to the fourth space can be securely suppressed, and the attenuation of the increase in temperature due to the increase in the leakage amount of the compressed air can prevent the burning of the components.

Further, a turbine according to a fifth aspect of the present invention includes the seal member according to any one of the first to fourth aspects.

According to the above-mentioned turbine, the leakage of the combustion gas from the second space to the fourth space can be securely suppressed by the seal member, and burning of the components can be prevented.

In addition, a gas turbine according to a sixth aspect of the present invention includes the turbine of the fifth aspect.

According to the above-mentioned gas turbine, in the turbine, the leakage of the combustion gas from the second space to the fourth space can be suppressed by the turbine including the seal member, and the burning of the components can be prevented.

Advantageous Effects of Invention

According to the seal member, the turbine, and the gas turbine according to the aspects of the present invention, the inflow of the combustion gas from the first gap between the inner shrouds can be suppressed by the seal member, and the burning of the components can be prevented.

DESCRIPTION OF EMBODIMENTS

First Embodiment

Hereinafter, a gas turbine 1 according to an embodiment of the present invention will be described.

Figure 1:
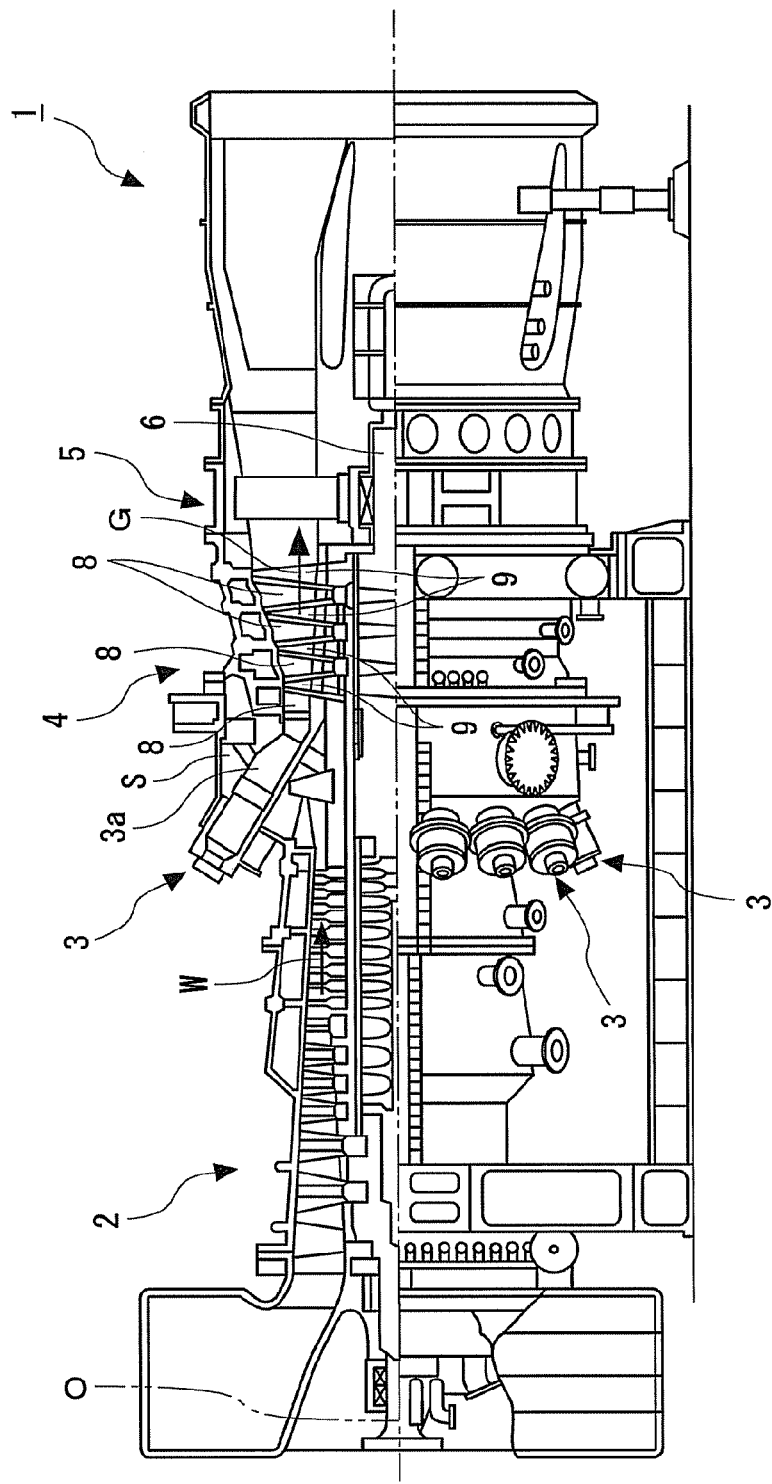
FIG. 1 is an overall schematic cross-sectional view of a gas turbine according to a first embodiment of the present invention.

As shown in FIG. 1, the gas turbine 1 includes a compressor 2 configured to generate compressed air W, a plurality of combustors 3 configured to temporarily store the compressed air W supplied from the compressor 2 in a casing S and then mix the compressed air W and fuel to generate a combustion gas G, and a turbine 4 configured to generate a rotational force by the combustion gas G supplied from the combustor 3 and rotate a rotary shaft 6 about the axis O serving as a rotational center. Further, the gas turbine 1 includes an exhaust chamber 5 configured to exhaust the combustion gas G passing through the turbine 4, and includes these components in sequence from an upstream side, toward which the compressed air W and the combustion gas G are supplied, toward a downstream side, toward which these are exhausted.

Here, the upstream side and the downstream side are an upstream side and a downstream side in a flow direction of the combustion gas G along the axis O of the rotary shaft 6.

Then, in this way, thermal energy of the combustion gas G is converted into rotational energy, and for example, a power generating apparatus (not shown) is connected via the rotary shaft 6 to obtain electric power.

The turbine 4 includes a plurality of turbine vane rows 8 and turbine blade rows 9 installed therein and alternately disposed along the axis O direction of the rotary shaft 6.

Here, in the embodiment, the turbine vane row 8 is the turbine vane row 8 of a first stage (hereinafter referred to as a first vane row 8) on the most upstream side to which a transition piece 3a of the combustor 3 is connected, and the turbine blade row 9 is the turbine blade row 9 of a first stage (hereinafter referred to as a first blade row 9) adjacent to the downstream side of the first vane row 8.

Figure 2:
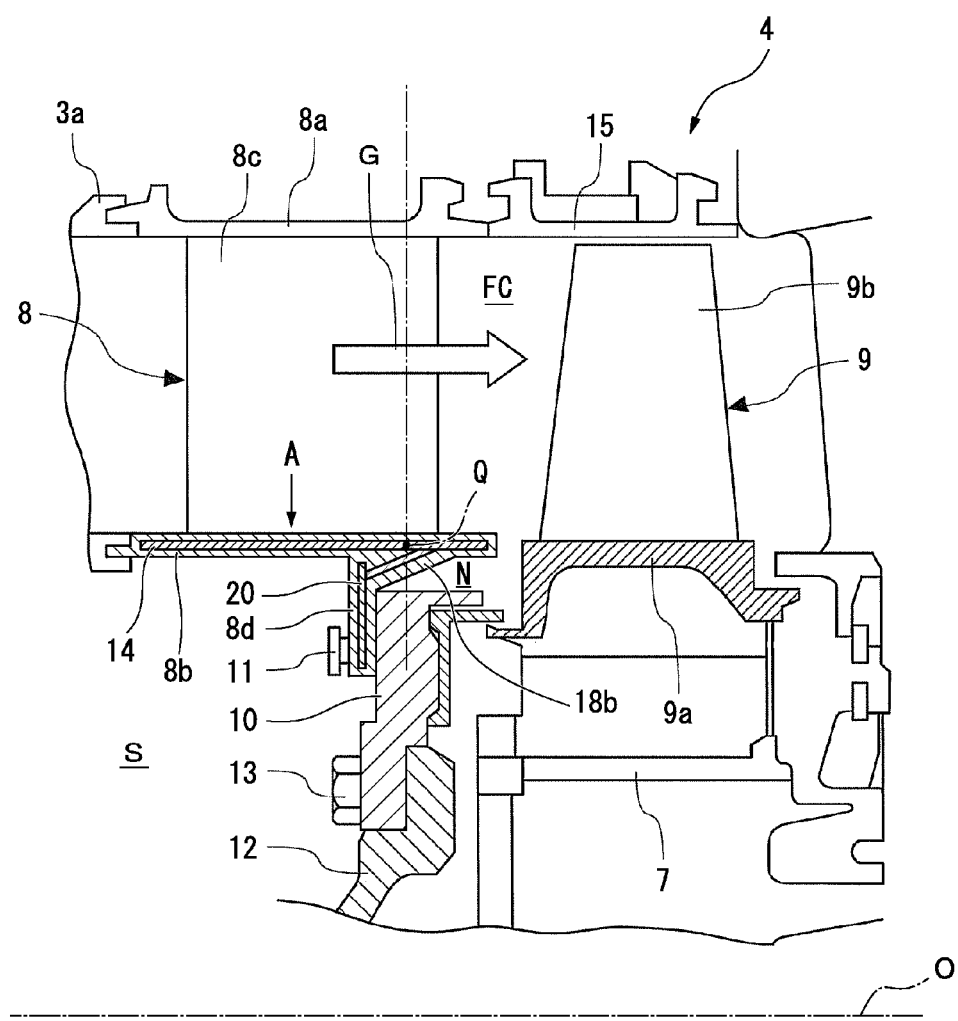
FIG. 2 is a view showing the gas turbine according to the first embodiment of the present invention, in which a periphery of a first vane row is enlarged.

As shown in FIG. 2, the first blade row 9 has a plurality of blades disposed at predetermined intervals in the circumferential direction of the axis O (hereinafter, simply referred to as the circumferential direction), and forms an annular shape with the blades fitted into an outer circumferential surface of a turbine disk 7 on the most upstream side, on the rotary shaft 6 formed of a plurality of turbine disks 7 being connected in the axis O direction.

Further, each of the blades includes a platform 9a that constitutes an inner wall of the turbine 4, and a blade main body 9b protruding outward from a surface of the platform 9a in the radial direction of the axis O (hereinafter, simply referred to as the radial direction).

In addition, a ring segment 15, which is configured to cover the first blade row 9 inside in the radial direction of a turbine casing (not shown) from the outside in the radial direction, is disposed in the circumferential direction at a distal end outside in the radial direction of the first blade row 9 so as to face the distal end.

Next, the first vane row 8 will be described.

The first vane row 8 has a plurality of vanes disposed adjacent to each other in the circumferential direction to form an annular shape.

In addition, each of the vanes has a vane main body 8c extending in the radial direction of the rotary shaft 6, an outer shroud 8a installed at an outer end section in the radial direction of the vane main body 8c, an inner shroud 8b installed at an inner end section in the radial direction of the vane main body 8c, and a retainer 8d protruding inward in the radial direction from a rear surface which is a surface on the inside in the radial direction of the inner shroud 21b.

In addition, the outer shrouds 8a are disposed in an annular shape in the circumferential direction so as to be in contact with the upstream end surface of the ring segment 15.

Figure 3:
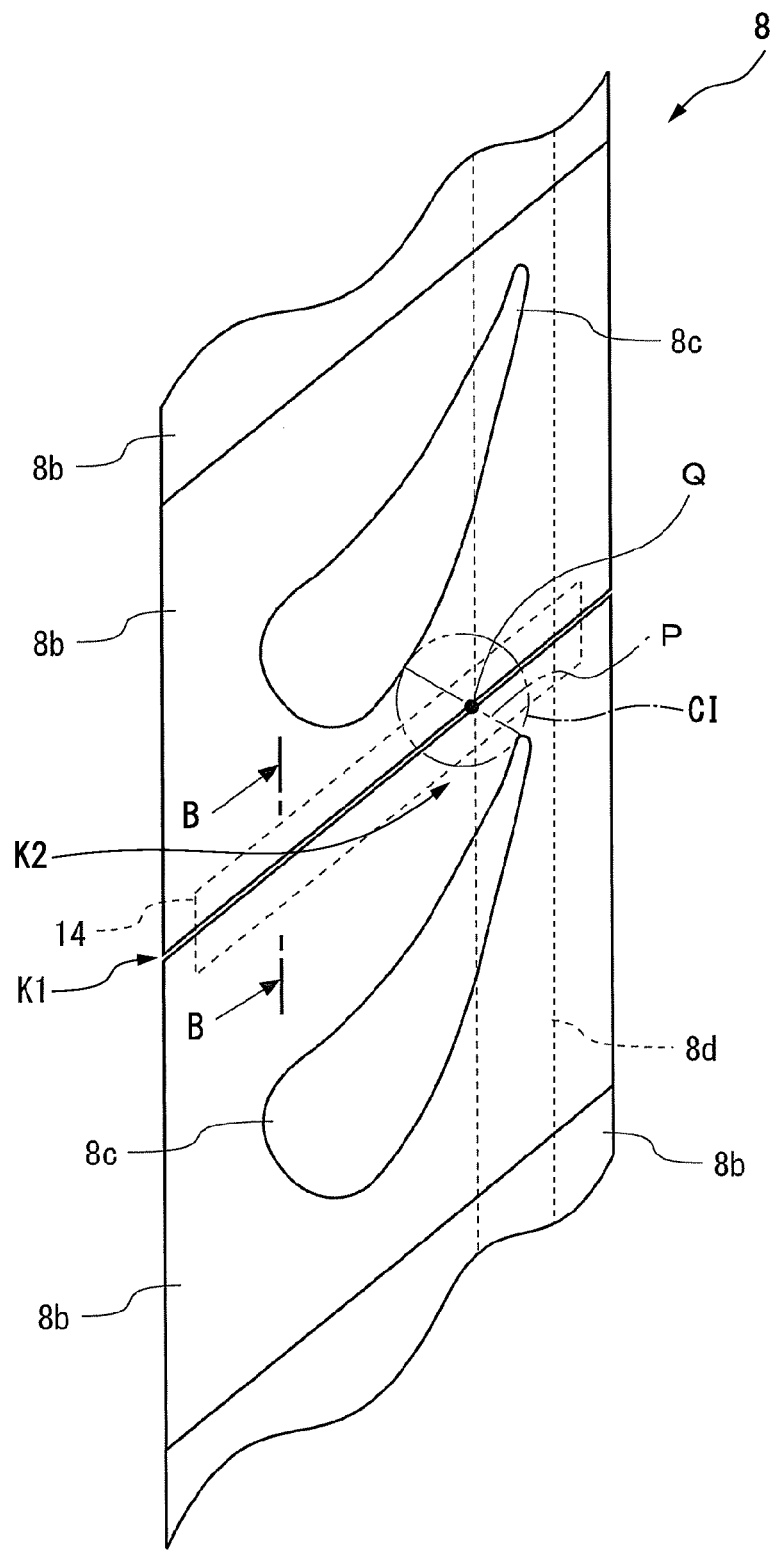
FIG. 3 is a view in the direction of the arrow A of FIG. 2 showing the gas turbine according to the first embodiment of the present invention when an inner shroud of the first vane row is seen from an outer surface in the radial direction.

As shown in FIG. 3, the inner shrouds 8b are formed in substantially a parallelogram (a diamond shape) when seen in a front view, and the inner shrouds 8b are disposed in the circumferential direction in an annular shape such that they are adjacent to each other with the surfaces thereof facing in the circumferential direction butting against each other via a first gap K1. An annular space is defined between the inner shroud 8b and the outer shroud 8a (see FIG. 2), and this space serves as a main flow path FC through which the combustion gas G flows.

Figure 4:
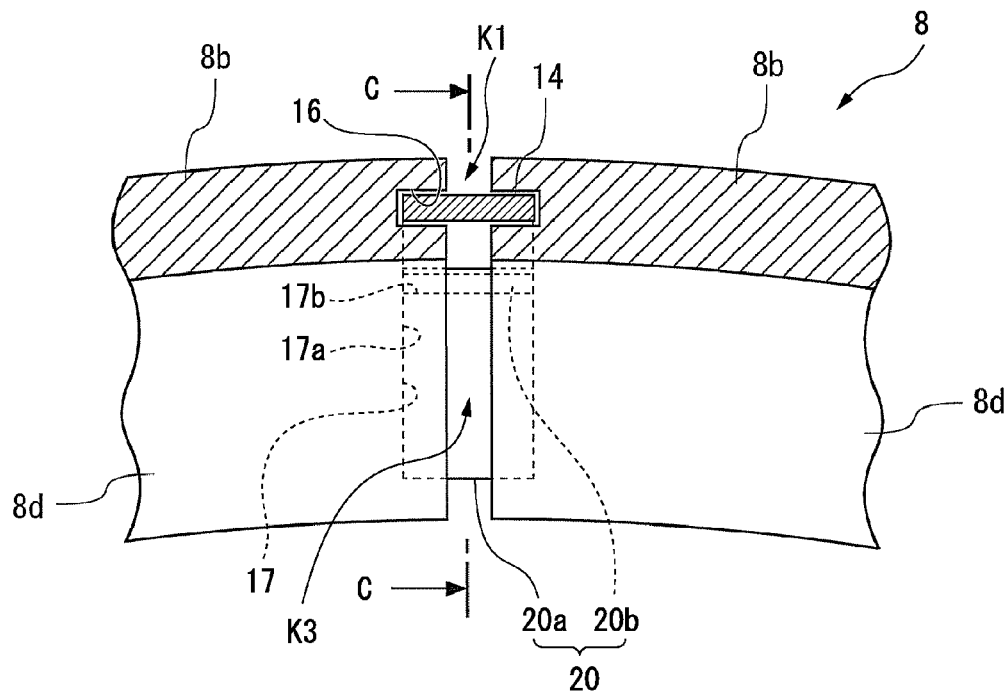
FIG. 4 is a view showing a cross-section along line B-B of FIG. 3 of the gas turbine according to the first embodiment of the present invention when the inner shroud of the first vane row and a retainer are seen in the axial direction.

In addition, as shown in FIG. 4, a first concave section 16 concaved in the circumferential direction is formed in a surface facing in the circumferential direction of the inner shroud 8b. A lateral seal plate 14 extending in the axis O direction to form a plate shape bridges between the first concave sections 16 facing each other and thereby closes the first gap K1.

The vane main bodies 8c have an air foil shape in which a surface facing one side in the circumferential direction has a concave shape while a surface facing the other side has a convex shape, and which is tapered as it extends toward the downstream side. The vane main bodies are disposed in the circumferential direction in an annular shape such that the surfaces facing in the circumferential direction butt against each other via a second gap K2. The vane main bodies 8c are coupled to the outer shroud 8a at an end section outside in the radial direction. That is, the vane main body 8c bridges between the inner shroud 8b and the outer shroud 8a in the main flow path FC.

Here, in the embodiment, while one vane main body 8c is installed at one inner shroud 8b, the plurality of vane main bodies 8c may be installed at one inner shroud 8b.

The retainer 8d is a member protruding from a rear surface of each of the inner shrouds 8b inward in the radial direction. The retainer 8d has a convex section 18a protruding from a rear surface of each of the inner shrouds 8b facing inward in the radial direction along the entire rear surface in the circumferential direction to form a plate shape. Further, an inclined surface 19 inclined downstream from the inside toward the outside in the radial direction is formed along the entire convex section 18a in the circumferential direction, from a position halfway in the radial direction in the surface of the convex section 18a facing the downstream side. The inclined surface 19 is connected to the rear surface of the inner shroud 8b at a downstream edge. The retainer 8d has an inclined section 18b which forms a right triangle when seen in the circumferential direction and is integrally installed in the convex section 18a, as a region surrounded by the surface of the convex section 18a facing downstream, the rear surface of the inner shroud 8b and the inclined surface 19 is formed as a solid region.

Further, the retainer 8d is fixed by a pin 11. The surface of the convex section 18a facing downstream further inside in the radial direction than the inclined section 18b is butted against an annular support ring 10 which is fixed by a bolt 13 on an intermediate shaft cover 12 formed around the rotary shaft 6. Displacement of the first vane row 8 in a direction in which it approaches the first blade row 9 is suppressed by the support ring 10.

Here, the support ring 10 and the retainer 8d are fixed in a state in which a slight gap is formed among the end surface of the support ring 10 facing outward in the radial direction, the inclined section 18b and the rear surface of the inner shroud 8b. That is, the gap forms an annular space N, and the space N is in communication with the main flow path FC via a gap between the first vane row 8 and the first blade row 9.

Figure 5:
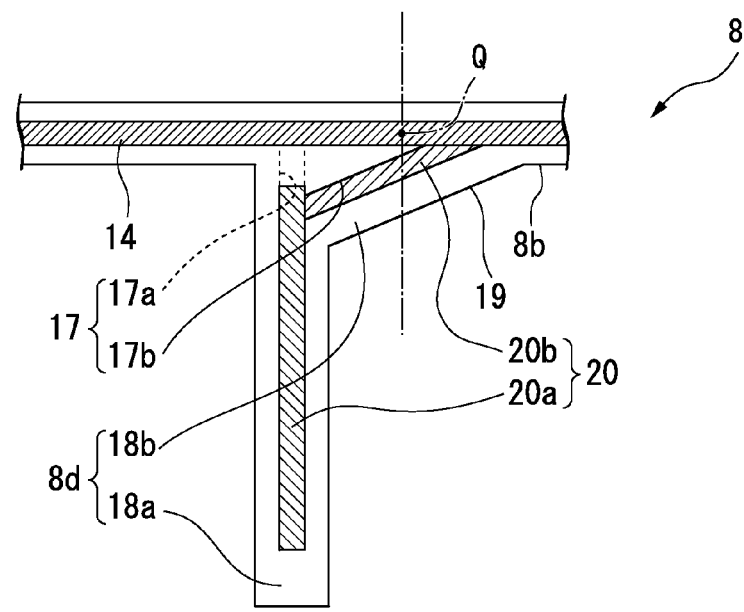
FIG. 5 is a view in the direction of the arrow C of FIG. 4 showing the gas turbine according to the first embodiment of the present invention when the inner shroud of the first vane row and the retainer are seen in the circumferential direction.

In addition, the retainer 8d is installed via a third gap K3 such that the surfaces thereof facing in the circumferential direction butt against each other. As shown in FIG. 5, a second concave section 17 concaved in the circumferential direction is formed in the surface of each of the retainers 8d facing in the circumferential direction. The second concave section 17 has a longitudinal concave section 17a formed in the convex section 18a of the retainer 8d in the radial direction, and a diagonal concave section 17b formed in the inclined section 18b along the inclined surface 19.

The longitudinal concave section 17a is connected to the first concave section 16 and formed to nearly reach the end section of the convex section 18a on the inside in the radial direction.

The diagonal concave section 17b is formed by communicating the longitudinal concave section 17a and the first concave section 16. A connecting portion between the diagonal concave section 17b and the first concave section 16 is disposed downstream from a predetermined position in the axis O direction.

Here, the predetermined position is an intersection point Q between the first gap K1 and a throat line P connecting contact points of minimum inscribed circles CI in contact with the vane main bodies 8c of the vanes adjacent in the second gap K2.

A seal member 20 bridges between the second concave sections 17 facing each other, and thus the third gap K3 is closed. More specifically, the seal member 20 has a longitudinal seal plate 20a and a diagonal seal plate 20b. The longitudinal seal plate 20a bridges between the longitudinal concave sections 17a facing each other and the diagonal seal plate 20b bridges between the diagonal concave sections 17b facing each other.

Here, the longitudinal seal plate 20a has a dimension in the radial direction smaller than that in the radial direction of the longitudinal concave section 17a so as not to contact with the lateral seal plate 14 in the first concave section 16. That is, the third gap K3 is opened between the lateral seal plate 14 and the longitudinal seal plate 20a.

In addition, one end of the diagonal seal plate 20b is installed so as to come in contact with the end section of the longitudinal seal plate 20a outside in the radial direction, and the other end is installed so as to come in contact with the lateral seal plate 14. That is, one end of the diagonal seal plate 20b is disposed upstream from the intersection point Q, and the other end is disposed downstream from the intersection point Q. In this way, the third gap K3 is completely closed, and the upstream side and the downstream side are partitioned by the retainer 8d.

In the above-described gas turbine 1, the space in the main flow path FC downstream from the intersection point Q has a pressure lower than that of the upstream side. In addition, the space N inside in the radial direction of the inner shroud 8b downstream from the retainer 8d is in communication with the space in the main flow path FC downstream from the intersection point Q. For this reason, the pressure in the space N is equal to the pressure in the space in the main flow path FC downstream from the intersection point Q, i.e., lower than that in the space in the main flow path FC upstream from the intersection point Q.

Meanwhile, the space inside in the radial direction of the inner shroud 8b upstream from the retainer 8d forms the casing S in which the compressed air W is stored, and which has a pressure higher than that in the space in the main flow path FC upstream from the intersection point Q.

In this way, the pressures are as follows: the casing S>the main flow path FC upstream from the intersection point Q>the space N.

Since the other end of the seal member 20 closing the third gap K3 is installed to be disposed downstream from the intersection point Q, the space having the same pressure as the casing S can be expanded to the downstream side of the intersection point Q.

Here, if the diagonal seal plate 20b is not installed and the third gap K3 is closed by only the longitudinal seal plate 20a, the space N comes in contact with the space in the main flow path FC upstream from the intersection point Q with the inner shroud 8b sandwiched therebetween.

In this case, part of the combustion gas G of the main flow path FC leaks from a void between the first gap K1 and the lateral seal plate 14 due to the differential pressure, and the leaking gas flows into the space N.

On this point, in the embodiment, as the diagonal seal plate 20b is installed, the space having the same pressure as the casing S comes in contact with the space in the main flow path FC upstream from the intersection point Q with the inner shroud 8b sandwiched therebetween. Accordingly, as the casing S has the pressure higher than that of the space in the main flow path FC upstream from the intersection point Q, inflow of part of the combustion gas G into the space N can be suppressed.

Further, as the diagonal seal plate 20b is used for the seal member 20, the length dimension of the seal can be increased, i.e., the length dimension of the second concave section 17 can be increased. For this reason, a leakage amount of the compressed air W from the casing S into the space N can be increased, and an increase in temperature of the space N can be attenuated.

According to the gas turbine 1 of the embodiment, since inflow of the combustion gas G into the space N can be suppressed by the diagonal seal plate 20b and the leakage amount of the compressed air W can be increased, the rear surface of the inner shroud 8b and the upper surface of the support ring 10 can be prevented from being burnt due to a decrease in thickness by high temperature oxidation or the like.

In the embodiment, the diagonal seal plate 20b does not have to be disposed along the inclined surface 19, i.e., the diagonal concave section 17b is not required to be formed along the inclined surface 19.

Figure 6:
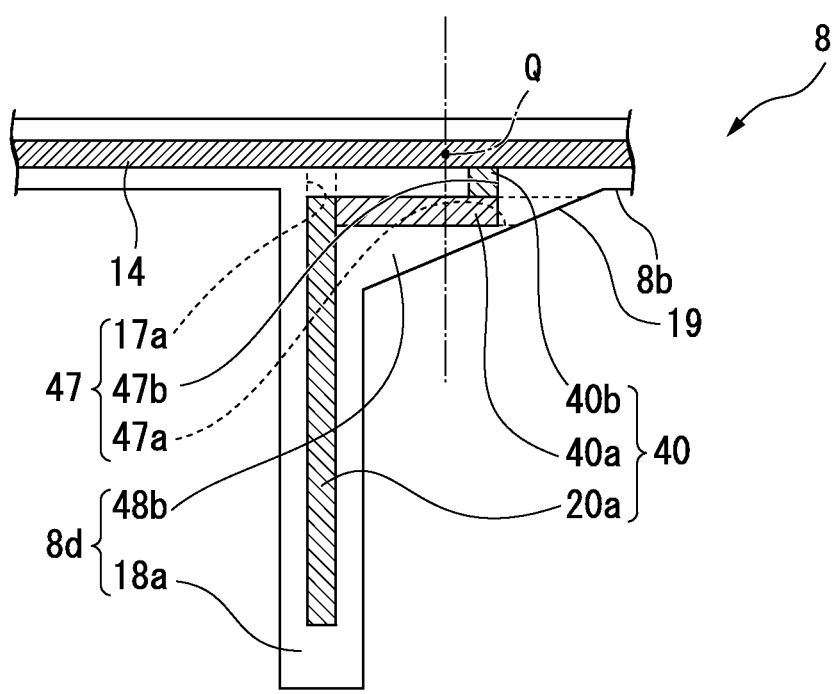
FIG. 6 is a view showing a variant of the gas turbine according to the first embodiment of the present invention when the inner shroud of the first vane row and the retainer are seen in the circumferential direction.

In addition, for example, as shown in FIG. 6, a seal member 40 may have the longitudinal seal plate 20a, a second lateral seal plate 40a having one end in contact with the longitudinal seal plate 20a and extending in the axis O direction to form a plate shape, and a second longitudinal seal plate 40b having one end in contact with the second lateral seal plate 40a and extending in the radial direction to form a plate shape.

In this case, in an inclined section 48b of the retainer 8d, a second concave section 47 has the above-mentioned longitudinal concave section 17a, a lateral concave section 47a communicating the longitudinal concave section 17a and the space N outside the inclined surface 19 and formed in the axis O direction, and a second longitudinal concave section 47b communicating the lateral concave section 47a and the first concave section 16 and formed in the radial direction downstream from the intersection point Q between the throat line P and the first gap K1.

While not shown, the seal members 20 and 40 may be formed only of a seal plate, which is disposed to be inclined, without the longitudinal seal plate 20a. In addition, the seal members may have another shape, as long as the other ends of the seal members 20 and 40 are disposed downstream from the intersection point Q and one ends are disposed upstream from the intersection point Q to be positioned in the third gap K3 between the retainers 8d so as to close the third gap K3. In this case, the shapes of the convex section 18a and the inclined sections 18b and 48b should be determined such that the seal members 20 and 40 are positioned inside the retainer 8d.

Further, the retainer 8d is not limited to the one which is constituted by the convex section 18a and the inclined sections 18b and 48b, but may be configured in any shape as long as the seal members 20 and 40 are disposed such that the other ends of the seal members 20 and 40 are positioned downstream from the intersection point Q and the one ends are positioned upstream from the intersection point Q so that the third gap K3 can be formed.

Second Embodiment

Next, a gas turbine 100A according to a second embodiment of the present invention will be described.

The same components as those of the first embodiment are designated by the same reference numerals, and detailed description thereof will be omitted.

In the embodiment, a retainer 58d of a vane in a first vane row 58 and a seal member 60 configured to close the third gap K3 are different from the first embodiment.

Figure 7:
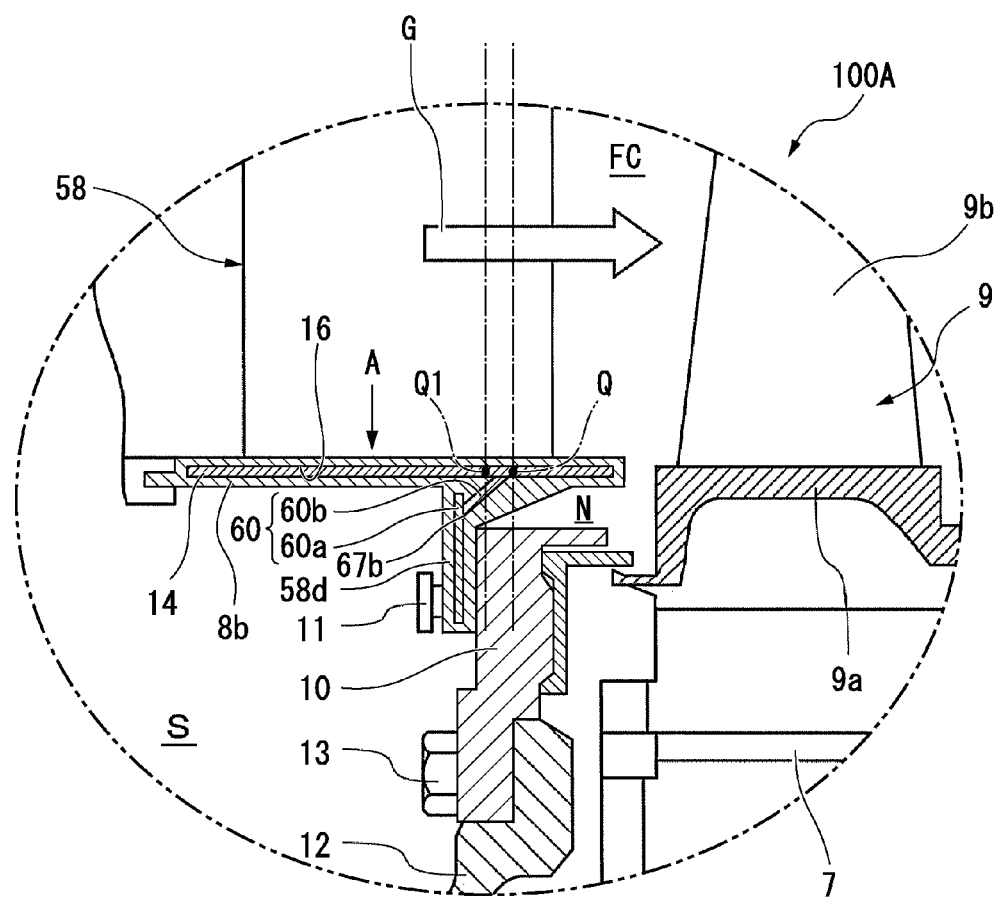
FIG. 7 is a view showing a gas turbine according to a second embodiment of the present invention, in which a first vane row is enlarged.
Figure 8:
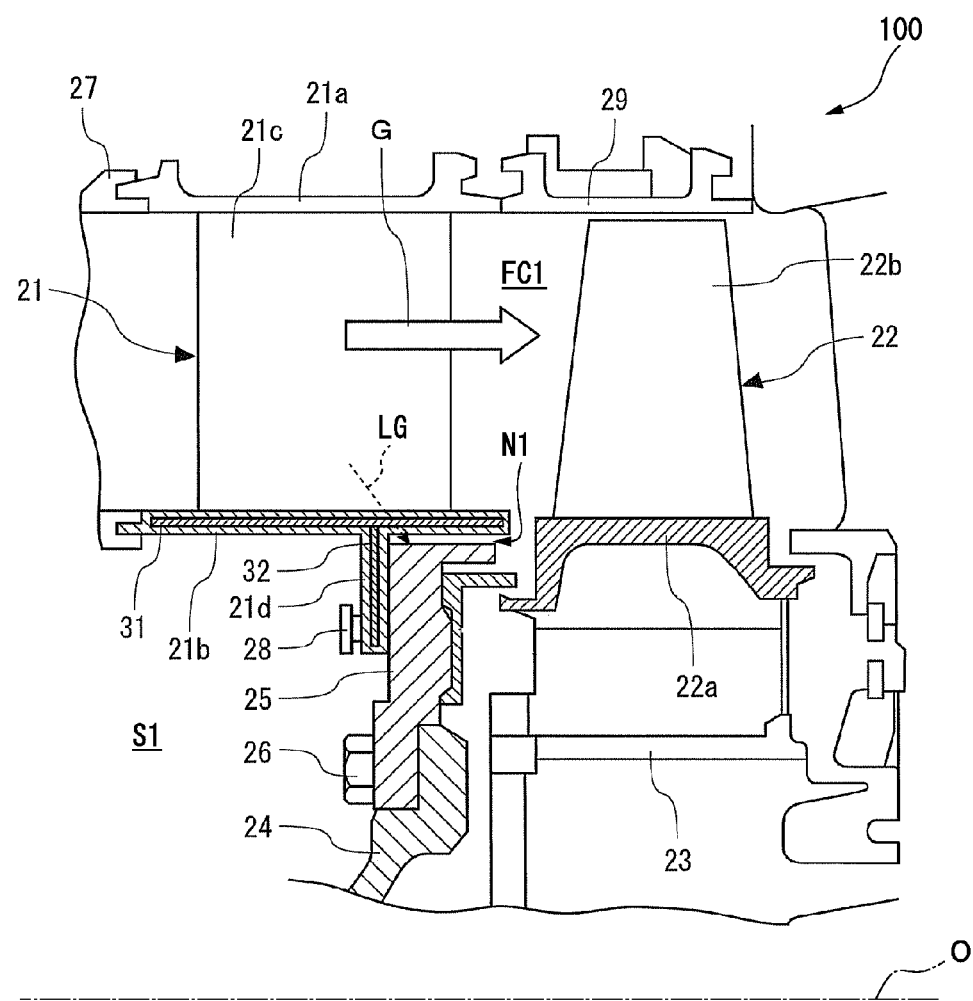
FIG. 8 is a view showing a gas turbine of the related art, in which a periphery of a first vane row is enlarged.
Figure 9:
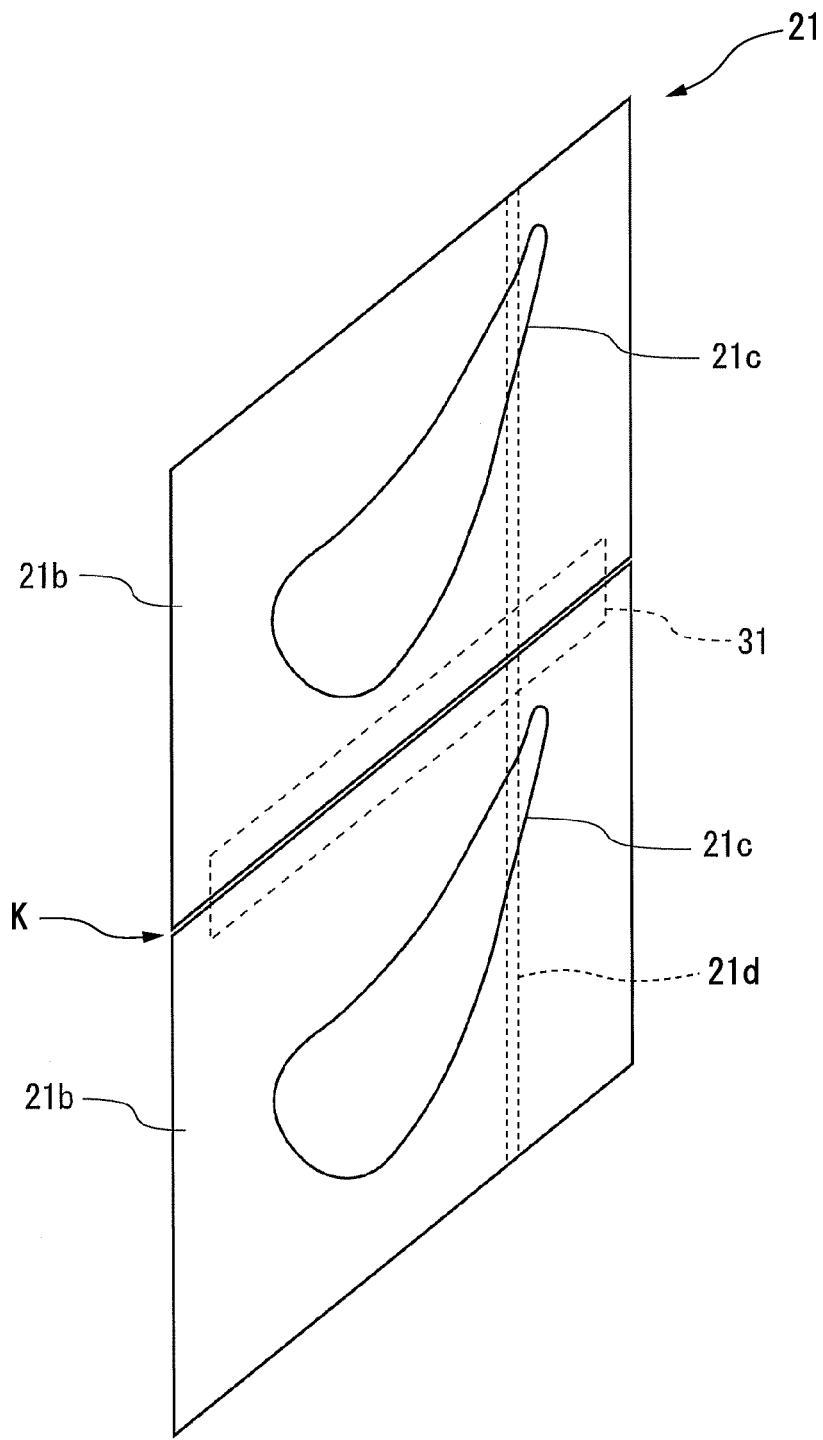
FIG. 9 is a view in the direction of the arrow C of FIG. 5 showing the gas turbine of the related art when an inner shroud of a first vane row is seen from an outer surface in the radial direction.

As shown in FIG. 7, the seal member 60 has a longitudinal seal plate 60a and a diagonal seal plate 60b.

The longitudinal seal plate 60a bridges between longitudinal concave sections 67a of the retainers 58d facing each other.

The diagonal seal plate 60b bridges between diagonal concave sections 67b of the retainers 58d facing each other.

The longitudinal concave section 67a has one end connected to the first concave section 16 and the other end formed to nearly reach the end section inside in the radial direction of the convex section 18a. The diagonal concave section 67b has one end connected to the longitudinal concave section 67a and the other end connected to the first concave section 16, and is formed by communicating the longitudinal concave section 67a and the first concave section 16. The connecting portion between the diagonal concave section 17b and the first concave section 16 is disposed downstream from a position Q1 in the axis O direction.

In addition, the other end of the diagonal seal plate 60b is positioned downstream from the same pressure position (the point Q1 of FIG. 7), which is a position in the axis O direction in the main flow path FC at which the pressure is the same as in the space N. That is, the inclination angle of the diagonal concave section 67b outward in the radial direction with respect to the axis O when seen in the circumferential direction is larger in comparison with the first embodiment.

Here, in the embodiment, while the position of the above-mentioned point Q1 is upstream from the intersection point Q of the first embodiment, in reality, the point Q1 may be positioned downstream from the intersection point Q according to operation conditions of the gas turbine 100A, and the position of the point Q1 varies.

According to the gas turbine 100A of the embodiment, since the inflow of the combustion gas G into the space N can be suppressed by the diagonal seal plate 60b and the leakage amount of the compressed air W can be increased regardless of the operation conditions, the rear surface of the inner shroud 8b or the upper surface of the support ring 10 can be prevented from being reduced in thickness by high temperature oxidation and being burnt.

Hereinabove, while the preferred embodiments of the present invention have been described, the present invention is not limited to these embodiments. Additions, omissions, substitutions and other modifications of components may be made without departing from the spirit of the present invention. The present invention is not limited to the above description but is to be limited only by the accompanying claims.

For example, in the above-described embodiments, while the other end of the seal member 20 (40, 60) is positioned downstream from the intersection point Q or the point Q1, as long as the seal member 20 (40, 60) is installed such that at least the other end is disposed downstream from the one end, the leakage of the combustion gas G into the space N from the main flow path FC1 can be suppressed.

INDUSTRIAL APPLICABILITY

The present invention relates to disposition of the seal member in the turbine vane. According to the seal member, the turbine, and the gas turbine of the present invention, inflow of the combustion gas from the first gap between the inner shrouds can be suppressed by the seal member, and burning of the components can be prevented.

REFERENCE SIGNS LIST 1 gas turbine
2 compressor 3 combustor
3a transition piece
4 turbine
5 exhaust chamber
6 rotary shaft
7 turbine disk
8 turbine vane row (first vane row)
8a outer shroud
8b inner shroud
8c vane main body
8d retainer
9 turbine blade row (first blade row)
9a platform
9b blade main body
10 support ring
11 pin
12 intermediate shaft cover
13 bolt
14 lateral seal plate
15 ring segment
16 first concave section
17 second concave section
17a longitudinal concave section
17b diagonal concave section
18a convex section
18b inclined section
19 inclined surface
20 seal member
20a longitudinal seal plate
20b diagonal seal plate
W compressed air
G combustion gas
O axis
S casing
FC main flow path
N space
P throat line
Q intersection point
CI inscribed circle
K1 first gap
K2 second gap
K3 third gap
K gap
N1 space
FC1 main flow path
S1 casing
LG leaking gas
21 turbine vane row (first vane row)
21a outer shroud
21b inner shroud
21c vane main body
21d retainer
22 turbine blade row (first blade row)
22a platform
22b blade main body
23 turbine disk
24 intermediate shaft cover
25 support ring
26 bolt
27 transition piece
28 pin
29 ring segment
31, 32 seal plate
40 seal member
40a second lateral seal plate
40b second longitudinal seal plate
48b inclined section
47 second concave section
47a lateral concave section
47b second longitudinal concave section
100 gas turbine
58 first vane row
58d retainer
60 seal member
60a longitudinal seal plate
60b diagonal seal plate
67b diagonal concave section
Q1 point
100A gas turbine

The invention claimed is:

1. A seal member capable of being installed at a vane row constituted of a plurality of vanes disposed side by side in a circumferential direction of an axis of a turbine,
wherein,
the plurality of vanes comprises:
a vane main body extending in a radial direction of the axis;
an outer shroud installed at an outer end section of the vane main body in the radial direction of the axis;
an inner shroud installed at an inner end section of the vane main body in the radial direction of the axis to form a main flow path of a combustion gas between the outer shroud and the inner shroud; and
a retainer protruding inward in the radial direction of the axis from an inner surface of the inner shroud in the radial direction of the axis,
a space which stores air in a pressurized state, for generating the combustion gas, formed in the radial direction of the axis of the inner shroud and upstream of the retainer in a direction along the axis in a direction of the combustion gas in the turbine,
the inner shrouds in the vanes which are adjacent to each other in the circumferential direction of the axis are adjacent to each other in the circumferential direction of the axis via a first gap,
the vane main bodies in the vanes which are adjacent to each other in the circumferential direction of the axis are adjacent to each other in the circumferential direction of the axis via a second gap,
the retainers of the vanes which are adjacent to each other in the circumferential direction of the axis are adjacent to each other in the circumferential direction of the axis via a third gap,
the seal member bridges between the retainers and closes the third gap, a first end of the seal member being positioned upstream in a direction along the axis in a direction of the combustion gas in the turbine and a second end of the seal member is positioned downstream in the direction along the axis in the direction of the combustion gas in the turbine,
further comprises:
a longitudinal seal plate that forms a plate shape extending from an end section inside of the retainer in the radial direction of the axis to a halfway position outside in the radial direction of the axis;
a diagonal seal plate having one end in contact with an end section outside of the longitudinal seal plate in the radial direction of the axis and forming a plate shape inclined and extending from the inside toward the outside in the radial direction of the axis as it moves downstream, and
the diagonal seal plate extends from a downstream surface of the end section outside of the longitudinal seal plate toward the downstream in the direction along the axis so that the diagonal seal plate gradually goes apart from the end section outside of the longitudinal seal plate.

2. The seal member according to claim 1, wherein the first end is positioned upstream in the direction along the axis in the flow direction of the combustion gas from a same pressure position, which is a position in the main flow path at which the pressure is the same as the pressure on the downstream side of the retainer and on the inside of the inner shroud in the radial direction of the axis, and the same pressure position is a position so that the pressure on the downstream side of the same pressure position is lower than the pressure on the upstream side of the same pressure position, and the second end is positioned downstream from the same pressure position.

3. A turbine comprising the seal member according to claim 1 or 2.

4. A gas turbine comprising the turbine according to claim 3.

5. The seal member according to claim 1, wherein
along the second gap, the first end of the seal member is positioned upstream in the direction along the axis in the flow direction of the combustion gas from an intersection point between the first gap and a throat line connecting contact points of minimum inscribed circle in contact with the vane main bodies adjacent to each other, the second end of the seal member is positioned downstream from the intersection point.

\* \* \* \* \*